(12) United States Patent
De Ridder et al.

(10) Patent No.: US 9,296,640 B2
(45) Date of Patent: Mar. 29, 2016

(54) KNITTED FABRIC OF STEEL FIBERS

(75) Inventors: Frank De Ridder, Hofstade-Aalst (BE); Filip Lanckmans, Lennik (BE); Wim Verbrugge, Pittem (BE)

(73) Assignee: NV BEKAERT SA, Zwevegem (BE)

( * ) Notice: Subject to any disclaimer, the term of this patent is extended or adjusted under 35 U.S.C. 154(b) by 112 days.

(21) Appl. No.: 13/636,840

(22) PCT Filed: Jan. 19, 2011

(86) PCT No.: PCT/EP2011/050667
§ 371 (c)(1),
(2), (4) Date: Sep. 24, 2012

(87) PCT Pub. No.: WO2011/116992
PCT Pub. Date: Sep. 29, 2011

(65) Prior Publication Data
US 2013/0008209 A1 Jan. 10, 2013

(30) Foreign Application Priority Data

Mar. 26, 2010 (EP) ..................... 10157985

(51) Int. Cl.
| | |
|---|---|
| C03B 40/00 | (2006.01) |
| C03B 23/025 | (2006.01) |
| C03B 23/03 | (2006.01) |
| C03B 35/18 | (2006.01) |
| D02G 3/12 | (2006.01) |
| D02G 3/18 | (2006.01) |
| D02G 3/44 | (2006.01) |
| D04B 1/14 | (2006.01) |

(52) U.S. Cl.
CPC ........... *C03B 40/005* (2013.01); *C03B 23/0252* (2013.01); *C03B 23/03* (2013.01); *C03B 35/181* (2013.01); *D02G 3/12* (2013.01); *D02G 3/18* (2013.01); *D02G 3/443* (2013.01); *D04B 1/14* (2013.01); *Y10T 442/475* (2015.04)

(58) Field of Classification Search
USPC .......... 442/308, 6, 316; 66/190; 428/605, 606
See application file for complete search history.

(56) References Cited

U.S. PATENT DOCUMENTS

| | | | |
|---|---|---|---|
| 3,379,000 | A | 4/1968 | Webber et al. |
| 4,220,112 | A | 9/1980 | Neilsen |
| 4,930,199 | A | 6/1990 | Yanagisawa |
| 5,388,432 | A | 2/1995 | Lesage et al. |
| 5,834,382 | A | 11/1998 | Frebourg et al. |
| 6,289,702 | B1 | 9/2001 | Heirbaut et al. |

(Continued)

FOREIGN PATENT DOCUMENTS

| | | |
|---|---|---|
| BE | 09800212 | 7/2001 |
| EP | 0 477 785 A2 | 4/1992 |

(Continued)

*Primary Examiner* — Lynda Salvatore
(74) *Attorney, Agent, or Firm* — Foley & Lardner LLP

(57) ABSTRACT

A knitted fabric made from yarn comprising fibers. At least part of these are metal fibers. The yarn comprises at least 3 bundles or single yarns. The bundles or single yarns have an equivalent bundle diameter which are equal or differ maximally 40%. The fabric is used as a separation cloth (12) between mold (11) and glass (14), which is utilized in the process of forming glass plates, or for covering of press-on rings or press-rings and the means of transport by which glass plates are moved during the forming process. The use of yarns composed of least 3 bundles which more or less have the same equivalent bundle diameter reduces the risks for markings on the glass.

17 Claims, 2 Drawing Sheets

(56) References Cited

U.S. PATENT DOCUMENTS

| | | | |
|---|---|---|---|
| 6,701,703 B2* | 3/2004 | Patrick | 57/229 |
| 6,756,330 B1 | 6/2004 | Heirbaut et al. | |
| 6,952,915 B2* | 10/2005 | Prickett | 57/211 |
| 2003/0209003 A1* | 11/2003 | Verstraeten et al. | 57/212 |
| 2008/0107875 A1* | 5/2008 | Rosset et al. | 428/197 |

FOREIGN PATENT DOCUMENTS

| | | | | |
|---|---|---|---|---|
| WO | WO 94/01372 A1 | 1/1994 | | |
| WO | WO 94/01373 A1 | 1/1994 | | |
| WO | WO 97/04152 A1 | 2/1997 | | |
| WO | WO 98/32402 A1 | 7/1998 | | |
| WO | WO 2009147114 | * 12/2009 | | D02G 3/12 |

* cited by examiner

KNITTED FABRIC OF STEEL FIBERS

TECHNICAL FIELD

The present invention relates to a knitted fabric comprising fibers, at least part of these fibers being metal fibers.

The invention further relates to use of such fabric as a separation cloth for moulds and press-on rings which are utilized in the process of forming glass plates, or for covering the means of transport by which glass plates are moved during the forming process.

BACKGROUND ART

Knitted fabrics comprising metal fibers are described in WO97/04152, WO94/01372, WO94/01373 and U.S. Pat. No. 6,756,330.

The use of a textile fabric as separation cloth between mould and glass, to form side-lites and back-lites for automotive business is known. During this contact, temperatures of 400 to 700° C. are used. It is of great importance that no marks are left on the glass surface after the contact of the glass and the textile fabric.

The use of textile fabrics out of 100% glass fibers is known. The disadvantage of these glass fiber cloths is that they do not resist the mechanical action during the glass shaping process. Also the use of textile fabrics, partially or fully consisting out of metal fibers is known. Using these fabrics as mould coverings, the mechanical action of the bending process is withstood better, but there is still the risk of marking the glass, by transferring the woven or knitted pattern into the glass surface which has contacted the textile fabric.

Further, it is known that the use of knitted structures is more suitable to cover moulds, since knitted surfaces can be draped better on moulds and less or no folds will be created when bending the knitted fabric, especially on three-dimensionally shaped surfaces or moulds.

The risk of having marks, caused by use of textile fabrics as the separation cloth for moulds in glass bending processes, is influenced by several parameters, such as glass temperature and pressure used to bend the glass. Since for example the automotive industry requires more complex glass surfaces, that is glasses which show a deeper bend, the glass has to be heated to a higher temperature and the pressure to bend the glass, is increased as well. These two adjustments to the production parameters of the bending process, makes the glass more sensitive to markings since higher temperatures and/or pressures make the glass softer, and creates a more obvious transfer of the textile structure, either woven or knitted, on the glass surface because of the higher pressure.

Another parameter that influences the risk of marking, is the wear of the textile fabric, used as a separation cloth between moulds and glass, due to the repetitive contacts with glass sheets, and the temperature. This temperature makes the fibers become more sensitive to breaking forces, and the mechanical action of the glass sheets against the fabric makes the fabric wear out little by little. Since the fibers which are standing out on the yarn surface will suffer most on this mechanical action, they will disappear after several contacts with glass. The stitches out of which the knitted fabric is made or the weaving pattern used to provide the woven fabric, will be transferred more obviously to the glass surface.

Separation cloths should preferably meet next requirements:

1. The cloth should resist the bending temperature. Typically, these temperatures rise up to 700° C. when the bending takes place in the heated part of the furnace. When the glass bending takes place outside the furnace, the mould temperature will be less, at temperatures of 400 to 500° C.

2. The cloth should be able to follow the mould shape as close as possible.

3. The separation material should show sufficient air permeability. It is taken as a limit that separation cloths should at least have an air permeability of 400 $l/dm^2/min$, and preferably more than 750 $l/dm^2/min$.

4. The weight of the separation cloth is preferably between 600 $g/m^2$ and 2000 $g/m^2$. Fabrics with less weight usually wear out too fast, where too heavy fabrics tend to elongate too much under their own weight, so causing obstruction in the furnace for the glass to pass in the neighborhood of the fabric before or after the bending action.

5. The thickness of the separation cloth is preferably more than 0.8 mm and even more preferred more than 1 mm. Too thin fabrics show a lack of elasticity in the direction perpendicular to the fabric surface.

6. And as already mentioned, the risk for remaining marks on the glass surface should be reduced to a minimum.

The higher the number of requirements met, the better the performance of the separation cloth between mould and glass in the glass bending process will be.

DISCLOSURE OF INVENTION

It is an object of the present invention to provide a fabric with reduced risk of marking on the glass surface.

It is also an object of the present invention to provide a fabric which meets all of the above-mentioned minimum requirements.

An aspect of the claimed invention provides a knitted fabric which comprises yarn wherein the yarn comprising at least 3 fiber bundles. The yarn comprises at least one fiber bundle comprising metal fibers. Each of the fiber bundles are defined by an equivalent bundle diameter. The equivalent bundle diameter of each of the fiber bundles in the yarn are equal to each other or differ at most 40%.

The metal fiber bundles or single yarns used in the invention are defined by an equivalent bundle diameter. The equivalent bundle diameter is to be understood as the diameter of an imaginary bundle having a circular radial cross section, which cross section has a surface area identical to the equivalent fiber diameter multiplied by the amount of fibers in the bundle or single yarn.

The term "equivalent fiber diameter" of a particular fiber is to be understood as the diameter of an imaginary fiber having a circular radial cross section, which cross section having a surface area identical to the average of the surface areas of cross sections of the particular fiber.

In a preferred embodiment, the equivalent bundle diameter of the different bundles or single yarns in the yarn are differing maximally 30%, more preferably maximally 20% and even more preferably maximally 10%.

The first requirement, being the resistance to the temperatures used for the bending of the glass, is met by the use of metal fibers, usually stainless steel fibers.

Possibly, other high temperature fibers, such as glass fibers, ceramic fibers, meta-aramid fibers, para-aramid fibers, carbon fibers, preox-fibers and other high temperature resistant man-made fibers can be used, next to the metal fibers. The fiber bundles, of which at least one contains metal fibers, can be intimately blended and plied to a three or more plied yarn or the yarn can be a three- or more plied yarn, where some or all of the bundles or single yarns are made out of one fiber type. By plying yarns, it is meant that two or more bundles or yarns are given a torsion round the direction of the axes of the bundles or yarns resulting in a plied yarn.

Alternatively, the yarn can be assembled prior to knitting by bundling at least 3 fiber bundles or single yarns, or the bundles or single yarns can be fed separately during knitting in order to obtain a yarn with more than three yarn bundles.

In another alternative embodiment, the yarn can be produced by assembling already plied yarns.

In a preferred embodiment, the yarn used in the knitted fabric is build from 3, 4, 5, 6, 7, 8, 9, 10, 11 or 12 bundles or single yarns. Even more preferably, the yarn is build form only 3, 4, 5, 6 or 7 bundles or single yarns.

In the most preferred embodiment, the yarn used in the knitted fabric is built from 3 or 7 fiber bundles or single yarns. Use of 3 or 7 bundles or single yarns in a yarn provides a yarn which more or less resembles a perfectly round circle, which surprisingly proved to provide even better performing knitted fabrics which reduce, in use, the markings on the bent glass surface.

In a preferred embodiment, the yarn comprises three or more bundles or single yarns where all fibers in a bundle or single yarn are made out of one fiber type. Even more preferred, the yarn comprises at least one metal fiber bundle or single yarn and at least one glass fiber bundle or single yarn. Use of yarns in knitted fabrics comprising at least one bundle of metal fibers and at least one bundle of glass fibers gives a better result in optical distortion than yarns completely made of metal fiber bundles.

To meet the second requirement, being the drapeability, usually knitted structures are used.

The other characteristics, air permeability, thickness, weight and number of stitches, are largely influenced by the gauge of the knitting machine, the metrical number of the used yarns, the knitting structure and the settings of the knitting machine during the knitting action. The inventors, however, have discovered that the risk for glass markings can be substantially reduced, if not avoided, by the use of the fabric of the invention wherein the fabric has a maximum gauge of 24 needles/inch and that this maximum gauge can be reached with values of air permeability, thickness and weight which still fall within the above-mentioned ranges.

The yarns which can be used to realize fabrics, as subject of the invention, comprise at least one metal fiber bundle, comprising metal fibers, usually stainless steel fibers, possibly blended with glass fibers or ceramic fibers, other high temperature fibers, such as meta-aramid fibers, para-aramid fibers, carbon fibers, preox-fibers and other high temperature resistant man-made fibers. The fibers, of which at least a part being metal fibers, can be intimately blended and possibly plied or bundled to a three or more bundled yarn or the yarn can be a three or more bundled or plied yarn, where some or all of the single yarns or bundles are made out of one fiber type.

At least partially, the yarns will contain metal fibers. Usually, but not necessarily, stainless steel fibers are used. Alloys such as AISI 316 or AISI 316L, AISI 347, or other alloys out of the AISI 300 type are used. Also alloys out of the AISI-400 type or Aluchrome-type alloys can be used. These fibers can be bundle drawn, as described in U.S. Pat. No. 3,379,000, be made by shaving them from a coil, as described in U.S. Pat. No. 4,930,199 or melt extracted. Also metal fibers produced as described in U.S. Pat. No. 4,220,112 can be used.

These metal fibers have an equivalent fiber diameter usually between 1 and 100 µm, and more typically between 6 and 25 µm.

Typically, the fabric which is subject of the invention, has an air permeability of more than 400 l/dm$^2$/min and preferably more than 750 l/dm$^2$/min. The air permeability is measured using a circular test surface of 20 cm$^2$ and an underpressure of 100 Pa. The weight of the fabric will be more than 600 g/m$^2$ and less than 2000 g/m$^2$. The thickness of the fabric will be not less than 0.8 mm and preferably more than 0.9 mm.

Different knitting structures can be used to provide the fabric as subject of the invention. It was found that knitting structures single jersey ½, single jersey ⅓ and single jersey ¼ can be used to provide knitted fabrics, comprising metal fibers. Other single jersey structures, with more floating yarns such as single jersey ⅕, single jersey ⅙ or more, can be used. By single jersey structures is meant a knitting structure, obtainable by using one needle bed, providing one stitch for every needle in the needle bed per row of stitches.

Different gauges can be used to provide the fabric as subject of the invention. The gauge indicates the number of needles per inch on the needle bed or beds of the knitting machine. Typically gauges from 10 to 32 can be used. Preferably, the knitted fabric has a maximal gauge of 24 needles/inch. Best fabrics were provided using gauge 20 or less.

Different yarns with different metrical numbers can be used to provide the fabric as subject of the invention. The metrical number (Nm) of a yarn, as mentioned in the list, is an expression for the fineness of the yarn. It gives the length in meter of 1 gram mass of yarn. To obtain a fabric as subject of the invention, yarn bundles with preferably metrical numbers Nm 4 to 6 can be used. Finer yarn bundles such as Nm 7.5 or Nm 10 could also be used.

Reinforcement multifilament weft yarns with a titre of less than 180 tex, such as e.g. metal yarn or glass fiber yarns, can be incorporated, as described in the international application number PCT/BE98/0010.

A fabric as subject of the present invention, with two surfaces having different fiber content can be provided by using the plating technique as described in BE9800212.

According to another aspect of the present invention, there is provided a use of a fabric according to any one of the preceding fabrics for covering moulds and tempering or press-on rings or transporting cylinders which are utilized in the process of forming glass plates, or for covering the means of transport by which glass plates are moved during the forming process.

Still according to the present invention, there is provided a method for reducing the risk for marking the glass surface during bending.

BRIEF DESCRIPTION OF DRAWINGS

Example embodiments of the invention are described hereinafter with reference to the accompanying drawings in which.

MODE(S) FOR CARRYING OUT THE INVENTION

Figure 1:
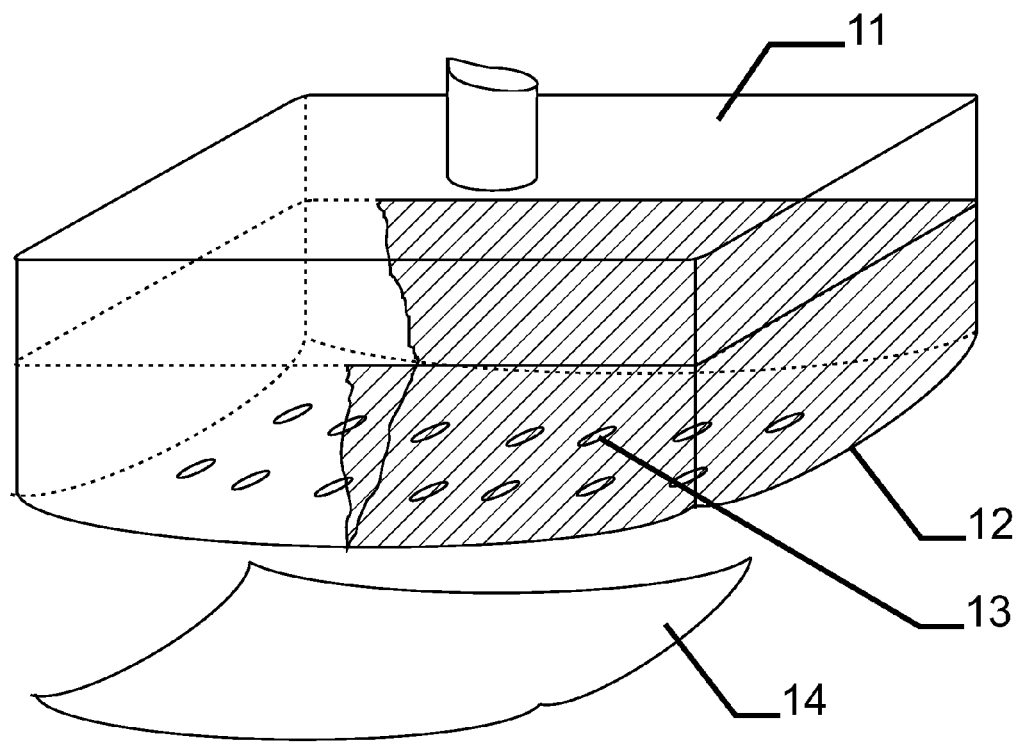
FIG. 1 shows a mould on which a separation cloth is mounted.

A schematic drawing of a glass shaping mould, covered with separation is given in FIG. 1. The mould 11 is here covered by a separation cloth 12 (shown partially). The glass 14, which is initially pre-cut but flat, sometimes already pre-shaped, is brought in contact with the mould 11 and the separation cloth 12, to transfer the shape of the mould into the glass 14. This can be done in many different ways. There is always a vacuum created between mould 11 and glass 14 when the glass 14 is in contact with the mould 11.

Therefore air is sucked through the mould perforations 13 and through the separation cloth 12.

Figure 2:
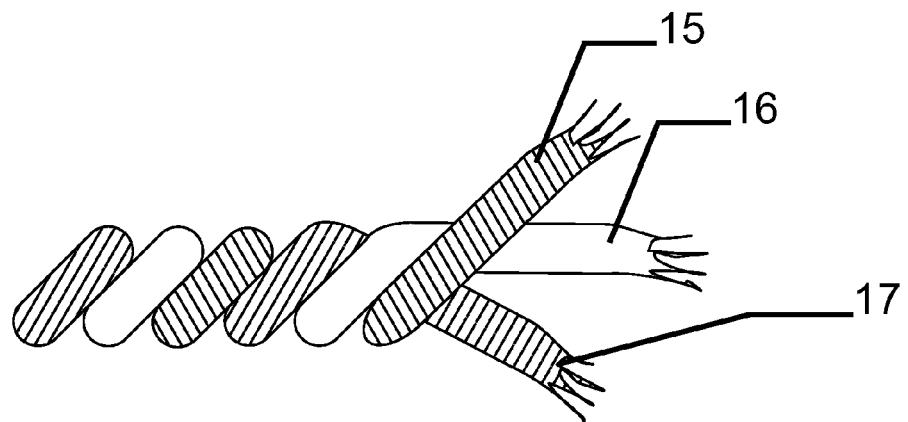
FIG. 2 shows a side view on a yarn with single yarns which consist out of one type of fibers.

It is part of the invention that at least one of the bundles or single yarns of the yarn used to provide the knitted fabric as subject of the invention, comprises metal fibers. Metal fibers can be incorporated in the yarns of the fabric in different ways. It can be done by bundling (not shown) or in an alternative embodiment by plying a single yarn (see FIG. 2), out of 100% metal fibers 15, with other single yarns 16 and 17, e.g. made 100% out of another heat resistant fiber, or a blend out of two or more different heat resistant fiber types. The type of heat resistant fibers used to make the different single yarns 16 and 17 are not necessarily the same types, and the compositions are not necessarily the same. These single yarns 15, 16 and 17 can be multifilament yarns or spun yarns, e.g. rotor-or open end spun yarn, or ringspun yarn.

Figure 3:
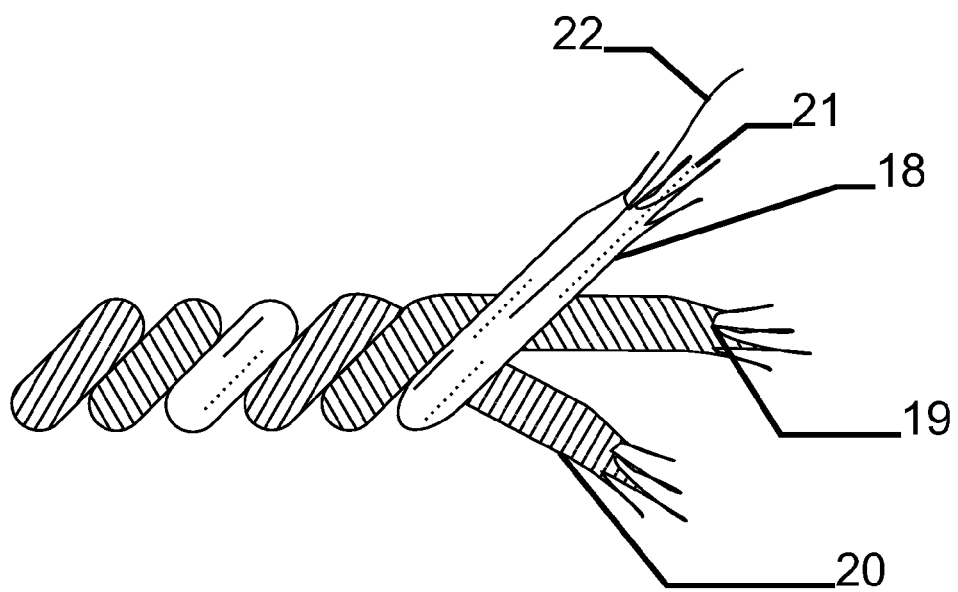
FIG. 3 shows a side view on a yarn with single yarns which are an intimate blend of different fibers.

Another way of incorporating metal fibers in the yarns is by assembling or in an alternative embodiment by plying different single yarns, from which at least one single yarn is a blend of metal fibers and at least one non metallic, high temperature resistant fiber type. This is shown in FIG. 3, where single yarn 18 is made out of metal fibers 21 and non metallic fibers 22. The other single yarns 19 and 20 are e.g. made 100% out of other heat resistant fibers, or a blend out of two or more different heat resistant fiber types. The type of heat resistant fibers used to make the different single yarns 18, 19 and 20 are not necessarily the same types, and the compositions are not necessarily the same. The single yarns 18, 19 and 20 can be multifilament yarns or spun yarns, e.g. rotor-or open end spun yarn, or ringspun yarn.

Some examples of the present invention is given in the tables underneath, where different yarns are used for the knitted fabric together with the gauge and weight and their performance is measured in terms of optical distortion (OD). All knitted fabrics in the examples are weft knitted fabrics with a knitting structure single jersey ⅓.

Table 1 shows the compositions of the different yarns used to manufacture the knitted fabric, table 2 shows some more particulars of the knitted fabrics which where tested and were composed of the yarns as described in table 1. Furthermore, table 2 gives the test results of the optical distortion measurements.

In table 1 and 2 following abbreviations are used:

A is the amount of fibers in bundle 1/type (SS=stainless steel AISI 316L, GL=glass fiber)/equivalent fiber diameter (expressed in μm) of the individual fibers in the bundle;

ED is the equivalent bundle diameter expressed in μm;

B is the amount of fibers in bundle 2/type/equivalent fiber diameter of the individual fibers in the bundle;

C is the amount of fibers in bundle 3/type/equivalent fiber diameter of the individual fibers in the bundle;

F is the amount of fibers in bundle 4/type/equivalent fiber diameter of the individual fibers in the bundle;

G is the amount of fibers in bundle 5/type/equivalent fiber diameter of the individual fibers in the bundle;

OD stands for optical distortion of the formed glass plate, expressed in millidiopter (mdpt) as measured by an ISRA SCREENSCAN Faultfinder system (of the ISRA Vision company) using 4/5/12 filter.

The 3 bundles containing examples (example 1 to 7 and examples 11-14) are all 3 plied yarns.

The 5 bundles containing examples (example 8 to 10) are all an assembly of a 3-plied yarn (as described in §0041) with a 2-plied yarn of two glass fiber bundles.

Please note that the knitted fabrics were tested in two unrelated tests. Test run 1 was done with examples 1 to 10. Test run 2 was done with examples 11 to 14. Both tests were run on different glasses with different approval criteria (installation angle, customer specification, complexity glass) with respect to optical distortion. This explains the different rating criteria (result in table 2) between test run 1 (examples 1 to 10) and test run 2 (examples 11 to 14).

TABLE 1

| example | A | ED(A) | B | ED(B) | C | ED(C) | F | ED(F) | G | ED(G) |
|---|---|---|---|---|---|---|---|---|---|---|
| 1 | 100/SS/12 | 132 | 200/GL/7 | 105 | 200/GL/7 | 105 | | | | |
| 2 | 73/SS/12 | 108 | 200/GL/7 | 105 | 200/GL/7 | 105 | | | | |
| 3 | 100/SS/12 | 132 | 200/GL/7 | 105 | 200/GL/7 | 105 | | | | |
| 4 | 73/SS/12 | 108 | 200/GL/7 | 105 | 200/GL/7 | 105 | | | | |
| 5 | 177/SS/8 | 112 | 200/GL/7 | 105 | 200/GL/7 | 105 | | | | |
| 6 | 73/SS/12 | 112 | 73/SS/12 | 112 | | | | | | |
| 7 | 100/SS/12 | 132 | 100/SS/12 | 132 | | | | | | |
| 8 | 100/SS/12 | 132 | 200/GL/7 | 105 | 200/GL/7 | 105 | 200/GL/7 | 105 | 200/GL/7 | 105 |
| 9 | 73/SS/12 | 108 | 200/GL/7 | 105 | 200/GL/7 | 105 | 200/GL/7 | 105 | 200/GL/7 | 105 |
| 10 | 73/SS/12 | 108 | 200/GL/7 | 105 | 200/GL/7 | 105 | 200/GL/7 | 105 | 200/GL/7 | 105 |
| 11 | 73/SS/12 | 108 | 200/GL/7 | 105 | 200/GL/7 | 105 | | | | |
| 12 | 73/SS/12 | 112 | 73/SS/12 | 112 | 73/SS/12 | 112 | | | | |
| 13 | 73/SS/12 | 112 | 73/SS/12 | 112 | 100/SS/12 | 132 | | | | |
| 14 | 100/SS/12 | 132 | 200/GL/7 | 105 | 200/GL/7 | 105 | | | | |

TABLE 2

| example | gauge | weight (g/m$^2$) | thickness | AP (l/dm$^2$/min) | OD | result |
|---|---|---|---|---|---|---|
| 1 | 24 | 881 | 0.98 | 1070 | 49 | not OK |
| 2 | 24 | 695 | 0.87 | 1422 | 46 | borderline |
| 3 | 16 | 731 | 0.96 | 1222 | 46 | borderline |
| 4 | 16 | 588 | 0.87 | 1422 | 37 | OK |
| 5 | 16 | 629 | 0.85 | 1382 | 46 | borderline |
| 6 | 24 | 1025 | 1.14 | 971 | 71 | not OK |
| 7 | 16 | 1034 | 1.09 | 901 | 69 | not OK |
| 8 | 24 | 1233 | 1.19 | 705 | 50 | not OK |
| 9 | 24 | 1048 | 1.12 | 852 | 51 | not OK |
| 10 | 16 | 870 | 1.09 | 922 | 50 | not OK |
| 11 | 16 | 588 | 0.87 | 1422 | 19 | OK |
| 12 | 16 | 1201 | 1.19 | 762 | 27 | borderline |
| 13 | 16 | 1066 | 1.3 | 977 | 32 | not OK |
| 14 | 16 | 753 | 0.96 | 1216 | 28 | borderline |

The optical distortion (OD) of the formed glass plates was measured in a quantitative way using the commercially available ISRA SCREENSCAN Faultfinder system. The ISRA SCREENSCAN Faultfinder is based on Moiré effect distortion and is expressed in mdpt (millidiopter). The optical distortion is a measure for the marks in the formed glass plate; the lower the optical distortion (OD) test result, the better.

In the first test run (examples 1 to 10) an optical distortion (OD) of 37 is OK. An OD of 46 or 48 is borderline and an OD of above 49 is not OK. These rating criteria are determined by the specifications as explained above.

In the second test run (examples 11 to 14) an OD (optical distortion) of 19 is OK. OD of 27 and 28 is borderline and OD of 32 is not OK.

As can be seen in table 2, the optical distortion of a 2-plied yarn (see examples 6 and 7) is high. By using a higher amount of bundles in the yarn (see examples 1 to 5 for 3-bundle yarn and examples 8-10 for 5-bundle yarn) the OD can be lowered.

The results of examples 11 to 14 show that using glass fiber bundles together with stainless steel fiber bundles (see examples 11 and 14) lowers the optical distortion (compared to examples 12 and 13 which are completely made out of metal fiber bundles).

Thus there has been described a knitted fabric made from yarn comprising fibers. At least part of these are metal fibers. The yarn comprises at least 3 bundles or single yarns. The bundles or single yarns have an equivalent bundle diameter which are equal or differ maximally 40%. The fabric is used as a separation cloth (12) between mould (11) and glass (14), which is utilized in the process of forming glass plates, or for covering of press-on rings or press-rings and the means of transport by which glass plates are moved during the forming process. The use of yarns composed of least 3 bundles which more or less have the same equivalent bundle diameter reduces the risks for markings on the glass.

The invention claimed is:

1. A knitted separation cloth adapted to glass processing, comprising:
    yarn comprising at least three fiber bundles, at least one fiber bundle of the at least three fiber bundles comprising metal fibers,
    wherein each of said fiber bundles is defined by an equivalent bundle diameter, said equivalent bundle diameter of each of said fiber bundles in said yarn being equal to each other or differing maximally by 40%,
    wherein the knitted separation cloth is at least 0.8 mm thick,
    wherein the weight of the separation cloth is between 588 g/m$^2$ and 2000 g/m$^2$,
    wherein the yarn has a fineness of 4-10 Nm,
    wherein the knitted separation cloth is a weft knitted fabric with a single jersey knitted structure,
    wherein the knitted separation cloth has a temperature resistance such that the knitted separation cloth withstands temperatures of at least 400° C.

2. The knitted separation cloth as in claim 1, said yarn comprising at least one metal fiber bundle and at least one glass fiber bundle.

3. The knitted separation cloth as in claim 1, wherein said equivalent bundle diameter of each of said fiber bundles in said yarn differ maximally by 10%.

4. The knitted separation cloth as in claim 1, wherein said yarn comprises 3 or 7 fiber bundles.

5. The knitted separation cloth as in claim 1, wherein said knitted separation cloth has a maximum gauge of 24 needles/inch.

6. A method of covering a mould for forming glass plates, the method comprising
    disposing a knitted separation cloth according to claim 1 so as to cover the mould.

7. The knitted separation cloth as in claim 1, wherein said yarn has at least three plies, wherein all single yarns or all the bundles are made out of one fiber type.

8. The knitted separation cloth as in claim 1, wherein said metal fibers are bundle drawn stainless steel fibers.

9. The knitted separation cloth as in claim 1, wherein said yarn is a plied yarn comprising one ply which is a single yarn made out of 100% metal fibers.

10. The knitted separation cloth as in claim 1, wherein said yarn is a three ply yarn, comprising a single yarn made out of 100% metal fibers and two single yarns made out of 100% glass fibers.

11. A method of covering tempering rings or press-on rings for forming glass plates, the method comprising
    disposing a knitted separation cloth according to claim 1 so as to cover a tempering ring or a press-on ring.

12. A method of covering a transport member configured to move glass plates during formation of the glass plates, the method comprising
    disposing a knitted separation cloth according to claim 1 so as to cover the transport member.

13. The knitted separation cloth of claim 1,
    wherein the knitted separation cloth has a temperature resistance such that the knitted separation cloth withstands temperatures of at least 500° C.

14. The knitted separation cloth of claim 1,
    wherein the knitted separation cloth has a temperature resistance such that the knitted separation cloth withstands temperatures of at least 700° C.

15. The knitted separation cloth of claim 1, wherein the knitted separation cloth has an air permeability of at least 400 liter/dm$^2$/min.

16. The knitted separation cloth of claim 1, wherein the knitted separation cloth has an air permeability of at least 750 liter/dm$^2$/min.

17. The knitted separation cloth of claim 1, wherein the knitted separation cloth has a maximum gauge of 20 needles/inch or less.

* * * * *